(12) United States Patent
Reed

(10) Patent No.: US 10,139,039 B1
(45) Date of Patent: Nov. 27, 2018

(54) CAMERA TRIPOD FOR A SMART PHONE

(71) Applicant: Territha Reed, Little Rock, AR (US)

(72) Inventor: Territha Reed, Little Rock, AR (US)

(*) Notice: Subject to any disclaimer, the term of this patent is extended or adjusted under 35 U.S.C. 154(b) by 177 days.

(21) Appl. No.: 15/263,544

(22) Filed: Sep. 13, 2016

(51) Int. Cl.
| | |
|---|---|
| *F16M 11/04* | (2006.01) |
| *F16M 11/34* | (2006.01) |
| *F16M 11/16* | (2006.01) |
| *F16M 11/10* | (2006.01) |
| *F16M 13/00* | (2006.01) |
| *H04M 1/04* | (2006.01) |
| *H02J 7/35* | (2006.01) |
| *H02J 7/00* | (2006.01) |
| *G03B 17/56* | (2006.01) |

(52) U.S. Cl.
CPC ......... *F16M 11/041* (2013.01); *F16M 11/105* (2013.01); *F16M 11/16* (2013.01); *F16M 11/34* (2013.01); *F16M 13/00* (2013.01); *G03B 17/561* (2013.01); *H02J 7/0044* (2013.01); *H02J 7/355* (2013.01); *H04M 1/04* (2013.01)

(58) Field of Classification Search
CPC .................................................... F16M 11/041
USPC .......................................................... 320/101
See application file for complete search history.

(56) References Cited

U.S. PATENT DOCUMENTS

| | | | |
|---|---|---|---|
| 7,290,740 B2 | 11/2007 | Joy | |
| D607,037 S | 12/2009 | Lee | |
| 7,780,126 B2 | 8/2010 | Law | |
| 8,007,188 B2 | 8/2011 | Orf | |
| D676,032 S | 2/2013 | Russell | |
| 8,616,508 B1 | 12/2013 | Coleman | |
| 2005/0098692 A1 | 5/2005 | Yang | |
| 2013/0175413 A1 | 7/2013 | Waugh | |
| 2013/0233986 A1 | 9/2013 | Rasheta | |
| 2014/0326840 A1* | 11/2014 | King | H02J 7/355 248/125.7 |
| 2015/0155414 A1* | 6/2015 | Bedell | H01L 31/0543 320/101 |
| 2018/0055165 A1* | 3/2018 | Paul | A45C 5/02 |

* cited by examiner

*Primary Examiner* — Suresh Memula

(57) ABSTRACT

The camera tripod for a smart phone is an accessory for a personal data device. The camera tripod for a smart phone is an adjustable rubber grip that is designed attach a personal data device to a tripod without damaging or scratching the personal data device. The camera tripod for a smart phone further comprises a photoelectric cell bank and a cable that can be attached to the tripod to permit the personal data device to be charged while the personal data device is in use. The camera tripod for a smart phone comprises a plurality of grips, a base, and a threaded connector.

5 Claims, 6 Drawing Sheets

CAMERA TRIPOD FOR A SMART PHONE

CROSS REFERENCES TO RELATED APPLICATIONS

Not Applicable

STATEMENT REGARDING FEDERALLY SPONSORED RESEARCH

Not Applicable

REFERENCE TO APPENDIX

Not Applicable

BACKGROUND OF THE INVENTION

Field of the Invention

The present invention relates to the field of stands and structures for supporting objects, more specifically, a tripod configured for use with a personal data device.

SUMMARY OF INVENTION

The camera tripod for a smart phone is an accessory for a personal data device. The camera tripod for a smart phone is an adjustable rubber grip that is designed to attach a personal data device to a tripod without damaging or scratching the personal data device. The camera tripod for a smart phone further comprises a photoelectric cell bank and a cable that can be attached to the tripod to permit the personal data device to be charged while the personal data device is in use.

These together with additional objects, features and advantages of the camera tripod for a smart phone will be readily apparent to those of ordinary skill in the art upon reading the following detailed description of the presently preferred, but nonetheless illustrative, embodiments when taken in conjunction with the accompanying drawings.

In this respect, before explaining the current embodiments of the camera tripod for a smart phone in detail, it is to be understood that the camera tripod for a smart phone is not limited in its applications to the details of construction and arrangements of the components set forth in the following description or illustration. Those skilled in the art will appreciate that the concept of this disclosure may be readily utilized as a basis for the design of other structures, methods, and systems for carrying out the several purposes of the camera tripod for a smart phone.

It is therefore important that the claims be regarded as including such equivalent construction insofar as they do not depart from the spirit and scope of the camera tripod for a smart phone. It is also to be understood that the phraseology and terminology employed herein are for purposes of description and should not be regarded as limiting.

BRIEF DESCRIPTION OF DRAWINGS

The accompanying drawings, which are included to provide a further understanding of the invention are incorporated in and constitute a part of this specification, illustrate an embodiment of the invention and together with the description serve to explain the principles of the invention. They are meant to be exemplary illustrations provided to enable persons skilled in the art to practice the disclosure and are not intended to limit the scope of the appended claims.

DETAILED DESCRIPTION OF THE EMBODIMENT

The following detailed description is merely exemplary in nature and is not intended to limit the described embodiments of the application and uses of the described embodiments. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to practice the disclosure and are not intended to limit the scope of the appended claims. Furthermore, there is no intention to be bound by any expressed or implied theory presented in the preceding technical field, background, brief summary or the following detailed description.

Figure 1:
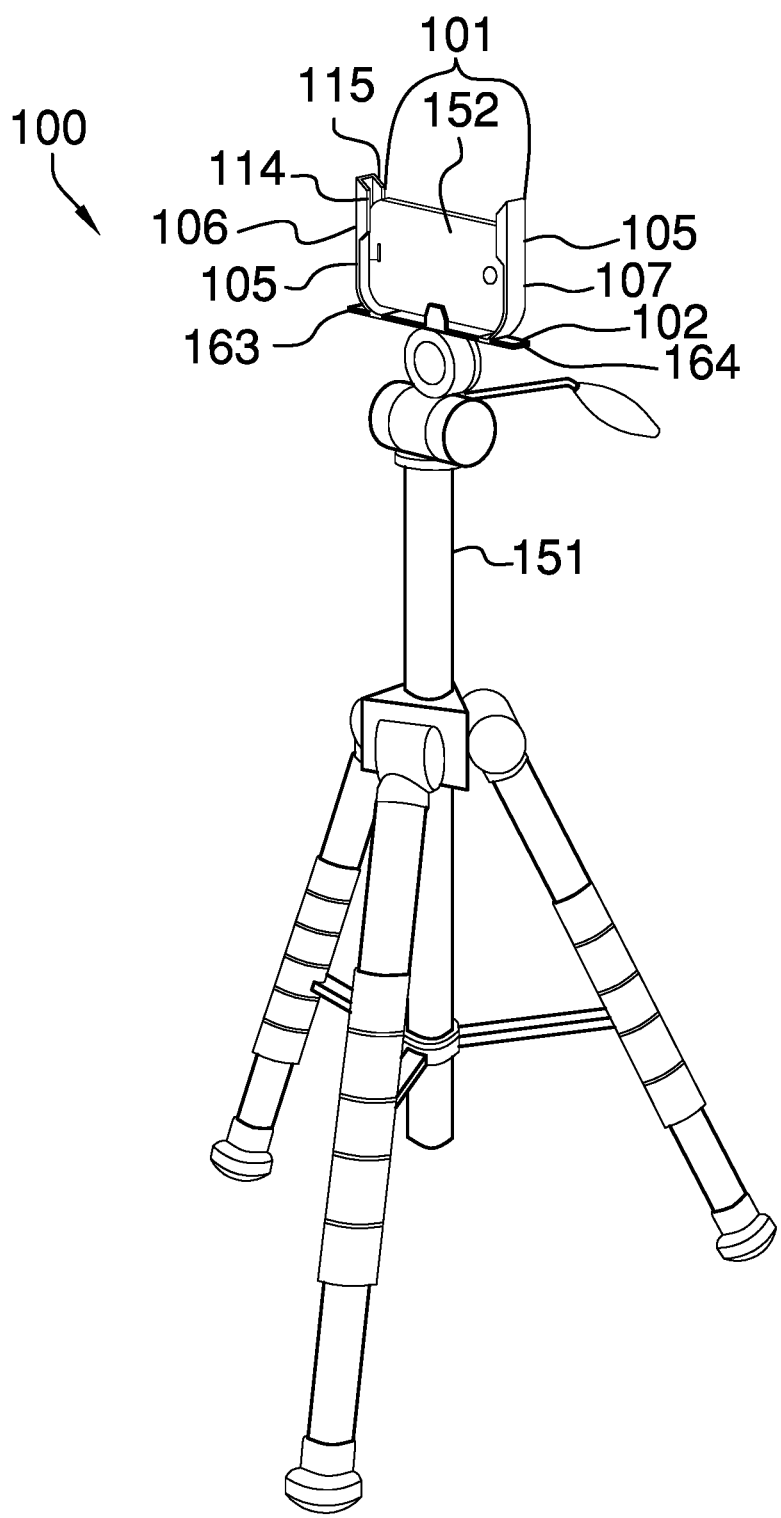
FIG. 1 is a perspective view of an embodiment of the disclosure.
Figure 2:
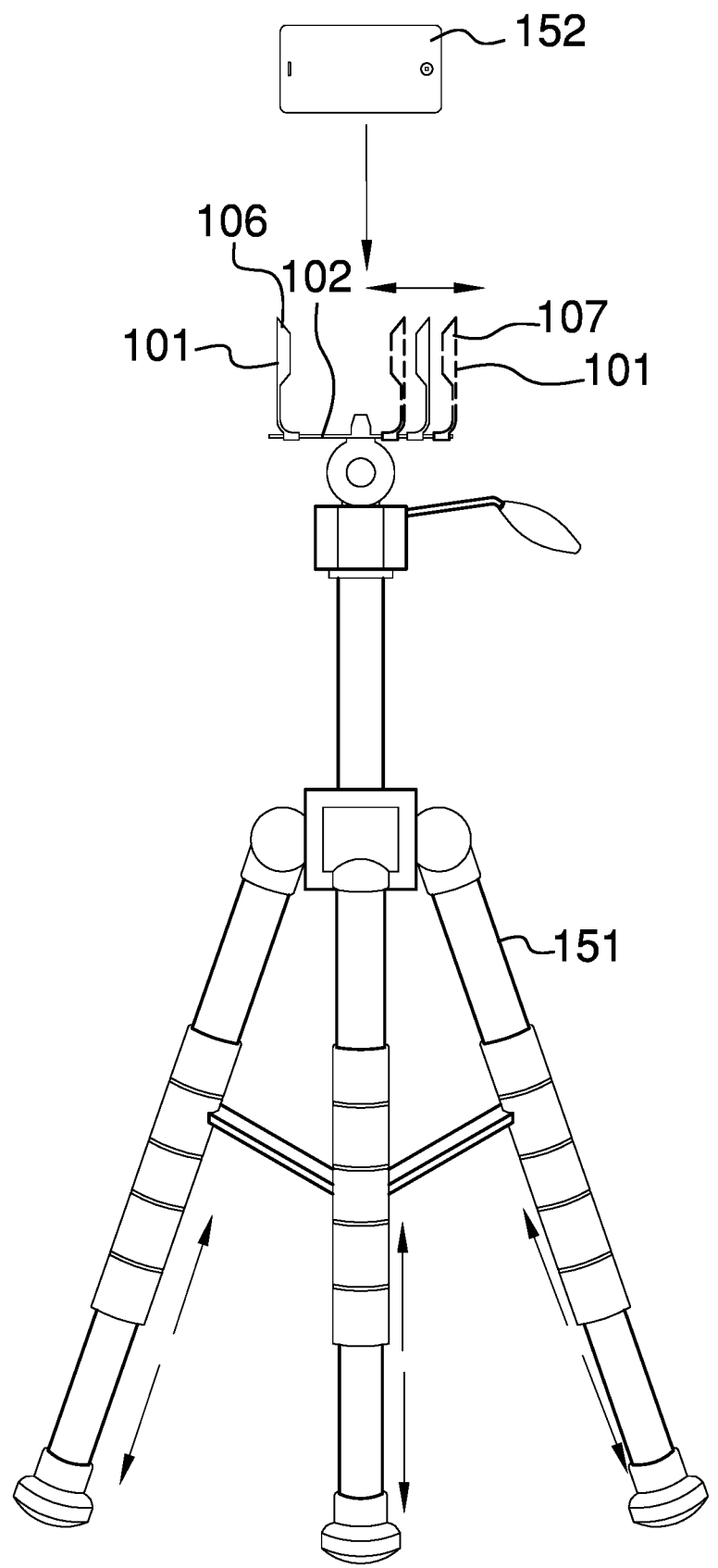
FIG. 2 is a front view of an embodiment of the disclosure.
Figure 3:
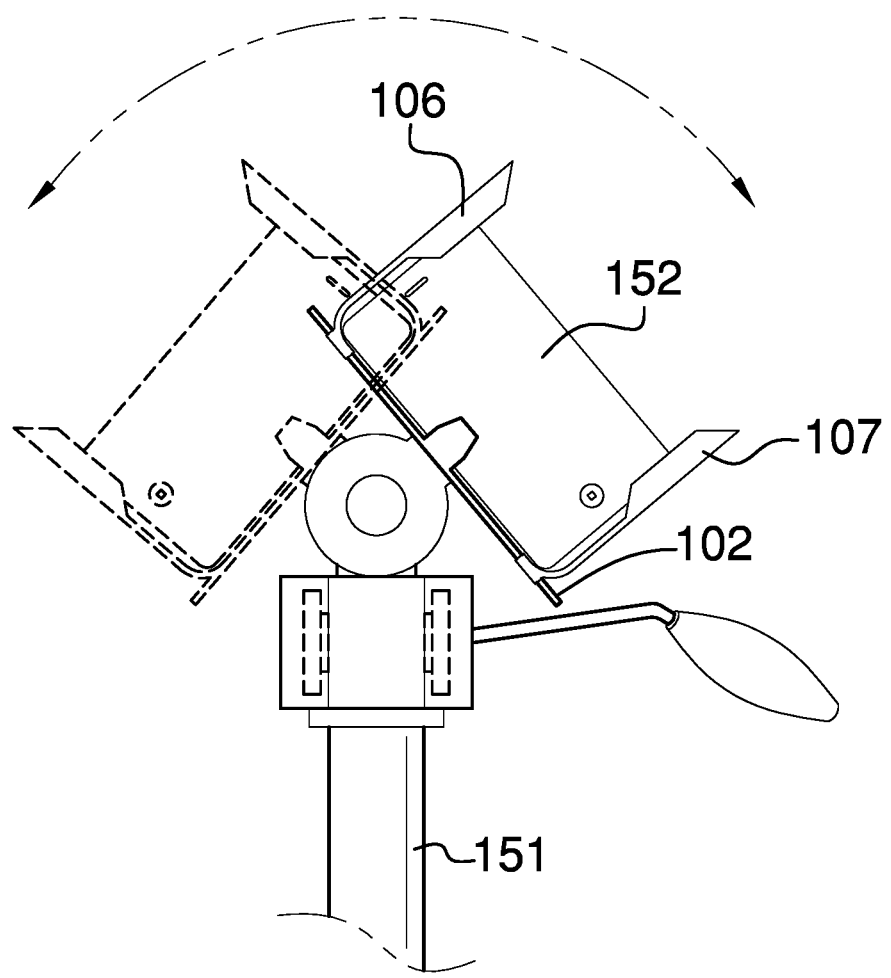
FIG. 3 is a detail view of an embodiment of the disclosure.
Figure 4:
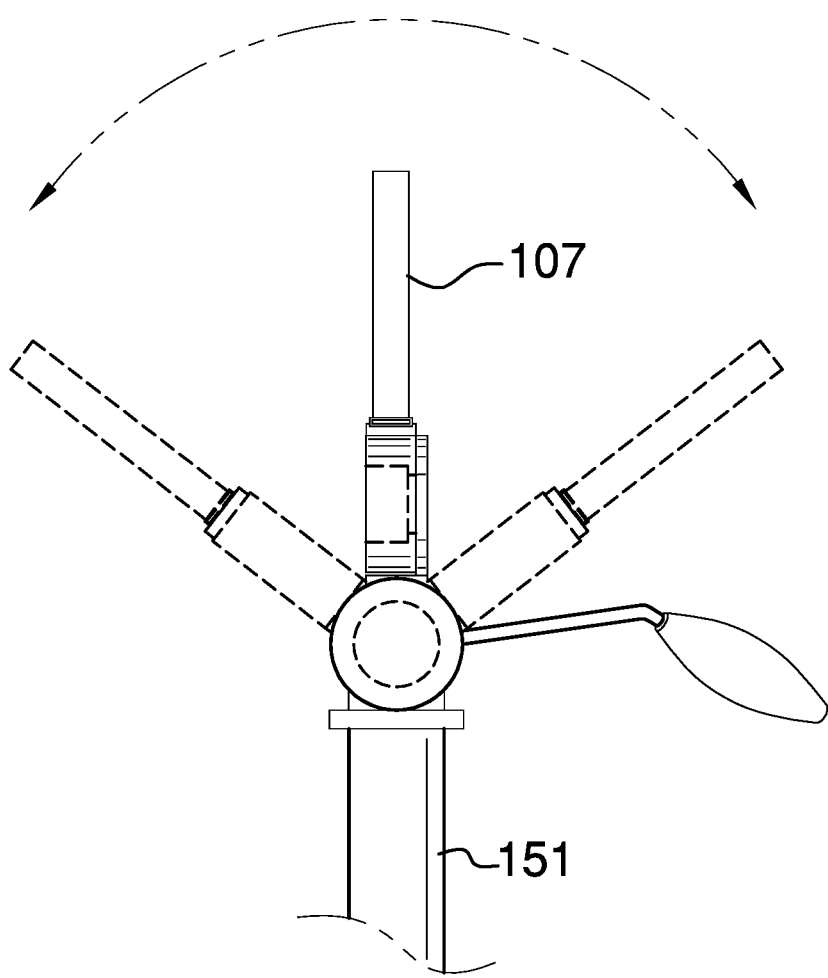
FIG. 4 is a detail view of an embodiment of the disclosure.
Figure 5:
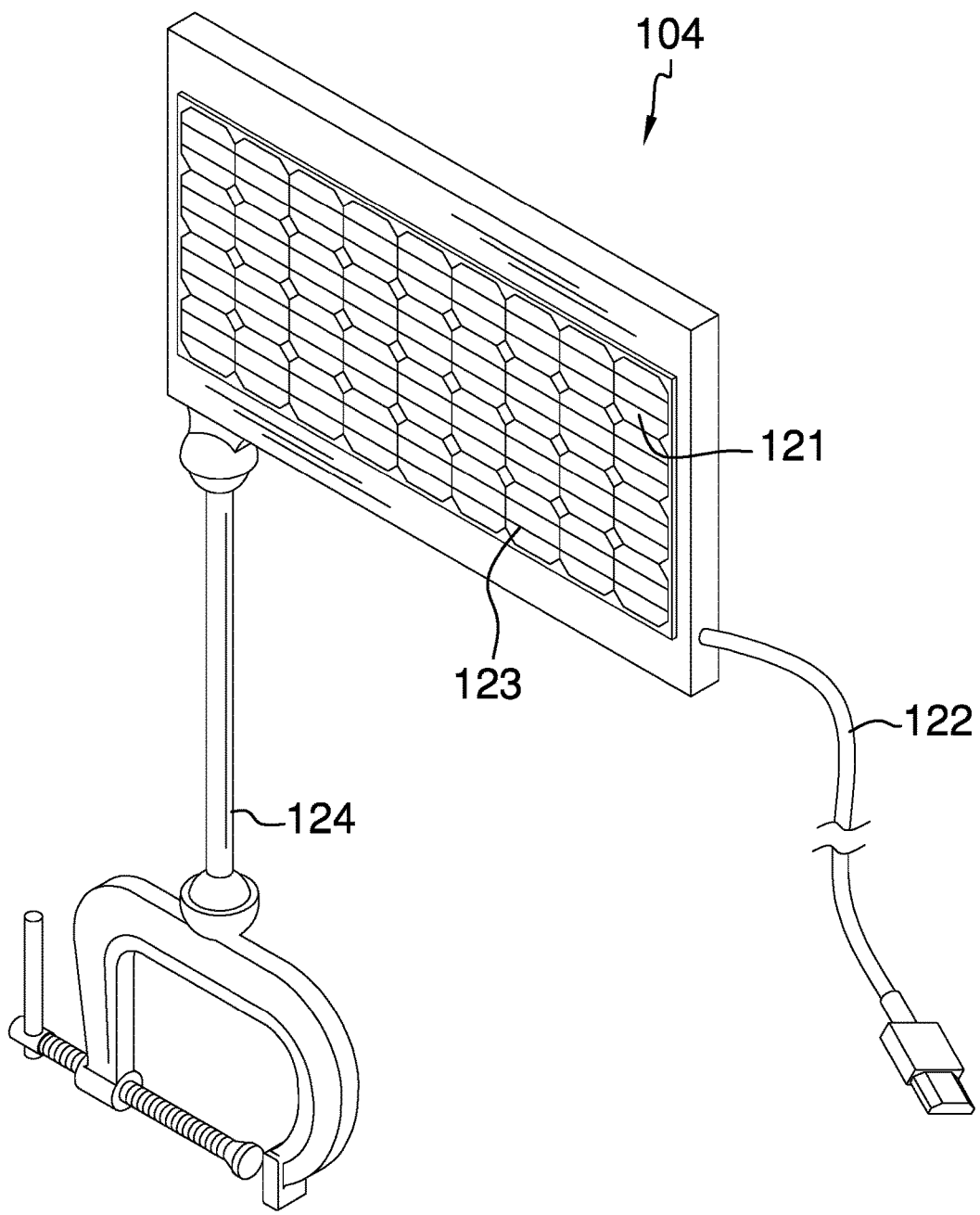
FIG. 5 is a view of an accessory associated with an embodiment of the disclosure.
Figure 6:
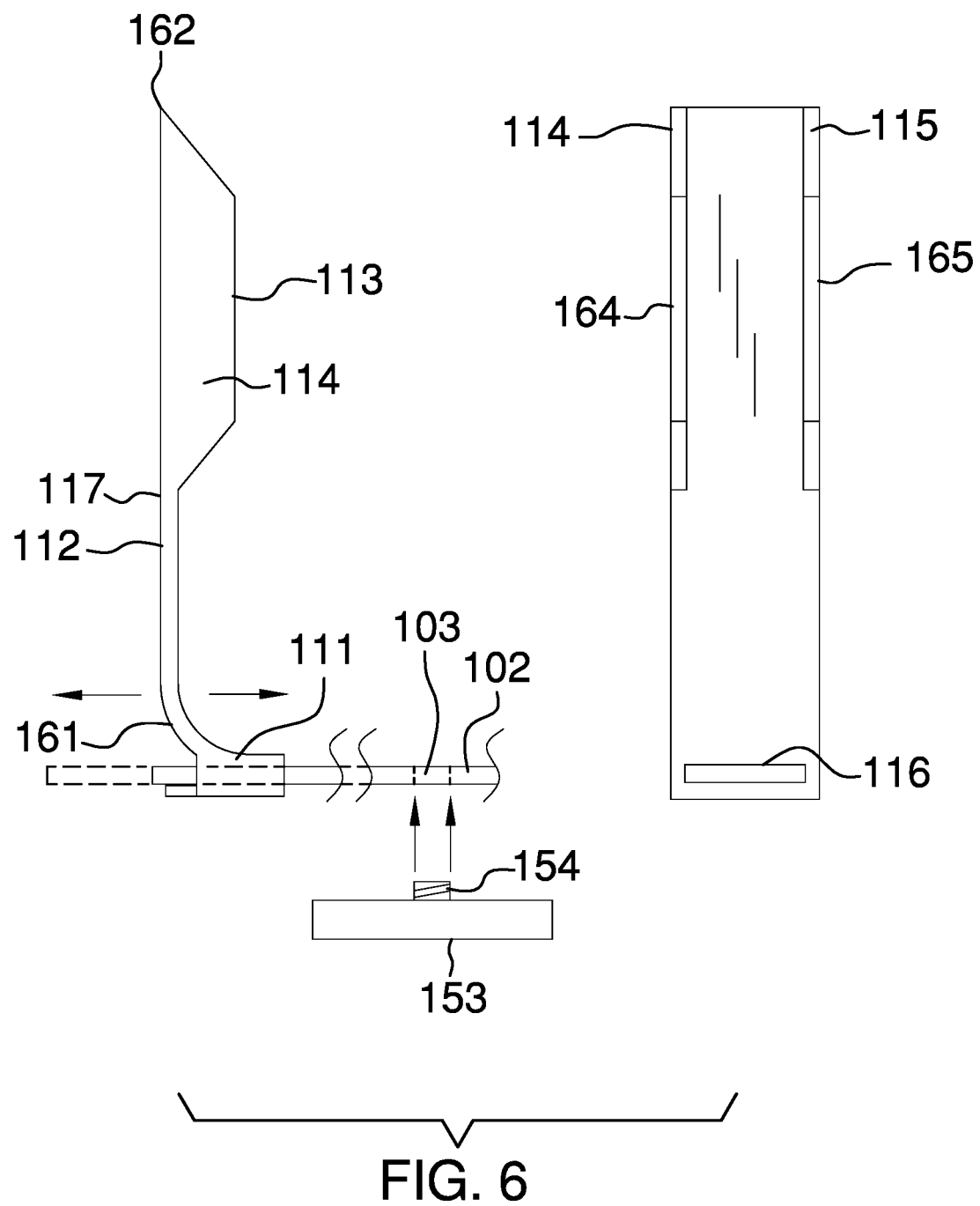
FIG. 6 is a detail view of an embodiment of the disclosure.

Detailed reference will now be made to a first potential embodiment of the disclosure, which is illustrated in FIGS. 1 through 6.

The camera tripod for a smart phone 100 (hereinafter invention) comprises a plurality of grips 101, a base 102, a threaded connector 103, and a charger 104. The invention 100 is an adapted for use with a personal data device 152. The invention 100 is adapted for use with a tripod 151. The invention 100 adjustably attaches a personal data device 152 to a tripod 151 without damaging or scratching the personal data device 152. The invention 100 further comprises a solar powered charger 104 that can be attached to the tripod 151 to permit the personal data device 152 to be charged while the personal data device 152 is in use and in the tripod 151.

The base 102 is a strip of rigid material that is formed in the shape of a rectangular block. The base 102 is further defined with a third end 163 and a fourth end 164. The base 102 forms the surface upon which the personal data device 152 is supported. The threaded connector 103 is a hole that is formed in the surface of the base 102 that is distal from the surface of the base 102 where the personal data device 152 is supported. The interior surface of the threaded connector 103 is formed with an interior screw thread. The threaded connector 103 is formed to receive the exterior screw thread of a standard connection post 154 that is provided with commercially available tripods 151 and quick release plates 153 associated with tripods 151.

The plurality of grips 101 comprises a collection of identical individual grips 105. Each individual grip 105 comprises a slider 111, a shaft 112, a plurality of clamps 113, and a base hole 116. The slider 111 attaches to the base 102. As shown most clearly in FIG. 7, the slider 111 is the curved section of the individual grip 105. The slider 111 has formed in it a base hole 116. The base hole 116 is a hole formed in the slider 111 that is sized to receive the third end 163 or the fourth end 164 of the base 102. The relative position of the individual grip 105 to the slider 111 can be changed via sliding the slider 111 through the base hole 102. The shaft 112 is a section of the individual grip 105 that projects perpendicularly away from the slider 111 in the direction away from the tripod 151. The shaft 112 is further defined with a first end 161 and a second end 162. Between the second end 162 of the shaft 112 and approximately the center point 117 between the second end 162 and the first end 161 is formed the plurality of clamps 113. Each of plurality of clamps 113 is a trapezoidal plate that projects perpendicularly away from the shaft 112.

The plurality of clamps 113 further comprises a first clamp 114 and a second clamp 115. The first clamp 114 and the second clamp 115 are parallel to each other. The first clamp 114 is located at the first edge 165 of the shaft 112. The second clamp 115 is located at the second edge 166 of the shaft 112. The first clamp 114 and the second clamp 115 are formed with adequate elasticity to form a cantilever spring. Specifically the elasticity is such that when the edge of a personal data device 152 is slipped between the first clamp 114 and the second clamp 115, the first clamp 114 and the second clamp 115 are separated. After the personal data device 152 is inserted, the cantilever action of the first clamp 114 and the second clamp 115 press against the personal data device 152 to hold the personal data device 152 in position. Each of the plurality of clamps 113 is coated in a protective elastomeric material to protect the personal data device 152 from damage.

The plurality of grips 101 further comprises a first grip 106 and a second grip 107. The plurality of grips 101 and the base 102 are assembled as follows: The third end 163 of the base 102 is inserted through the base hole 116 of the first grip 106 such that the plurality of clamps 113 project towards the fourth end 164 of the base 102. The fourth end 164 of the base 102 is inserted through the base hole 116 of the second grip 107 such that the plurality of clamps 113 of the second grip 107 project towards the third end 163 of the base 102.

The charger 104 provides power to charge and operate the personal data device 152 while the personal data device 152 is being used in the tripod 151. The charger 104 further comprises a photovoltaic cell bank 121 and a cable 122. The photovoltaic cell bank 121 comprises one or more photovoltaic cells that are arranged to form a face 123 that can be positioned towards a light source such as the sun. The light from the light source is used by the photovoltaic cell bank 121 to generate electricity, which is accessed through a USB port. The cable 122 is used to route electricity from the photovoltaic cell bank 121 to the personal data device 152. The selection of the cable 122 will depend on the personal data device 152. Commonly used cables would include, but are not limited to, a USB to USB cable, a USB to an Apple Lightning connector, or a USB to an Apple 30 pin connector. The photovoltaic cell bank 121 is attachable to the tripod 151. In the first potential embodiment of the disclosure, the photovoltaic cell bank 121 is attached to the tripod 151 using a fastener 124.

In the first potential embodiment of the disclosure, each of the plurality of grips 101 is molded as a single unit plastic. Suitable plastics include, but are not limited to, a crosslinked polybutadiene copolymer. Each of the plurality of grips 101 is then coated in a polyurethane coating as the protective elastomeric material. The base 102 is molded from plastic. Suitable plastics include, but are not limited to, polyethylene or polyvinylchloride.

The following definitions were used in this disclosure:

Center: As used in this disclosure, a center is a point that is: 1) the point within a circle that is equidistant from all the points of the circumference; 2) the point within a regular polygon that is equidistant from all the vertices of the regular polygon; 3) the point on a line that is equidistant from the ends of the line; or, 4) the point, pivot, or axis around which something revolves.

Exterior Screw Thread: An exterior screw thread is a ridge wrapped around the outer surface of a tube in the form of a helical structure that is used to convert rotational movement into linear movement.

Fastener: As used in this disclosure, a fastener is a device that is used to join or affix two objects.

Interior Screw Thread: An interior screw thread is a ridge wrapped around the inner surface of a tube in the form of a helical structure that is used to convert rotational movement into linear movement Personal Data Device: As used in this disclosure, a personal data device is a handheld device that is used for managing personal information and communication. Examples of personal data device include, but are not limited to, cellular phones, tablets and smart phones.

Photovoltaic Cell: As used in this disclosure, a photovoltaic cell is an electrical device that directly converts light energy into electrical energy.

Quick Release Plate: As used in this disclosure, a quick release plate is an optional accessory for a tripod head. The quick release plate is a plate with a tripod port that is attached to a visual recording device that can be attached to the tripod head using a latching system. The use of multiple quick release plates allows for rapidly and conveniently changing the visual recording device mounted on the tripod.

Strip: As used in this disclosure, the term describes a long thin object of uniform width. Strips are often rectangular blocks in shape.

Tripod: As used in this disclosure, a tripod is a three-legged stand that is used to support a visual recording device.

Tripod Head: As used in this disclosure, a tripod head is the portion of the tripod that is attached to the visual recording device to the tripod. Modern tripod heads incorporate a ball head design that allows the orientation of the visual recording device to be adjusted and then locked into position. Tripod heads further comprise a standardized tripod port, which is a standardized threaded connection that is used to connect the visual recording device to the tripod head.

USB: As used in this disclosure, USB is an acronym for Universal Serial Bus, which is an industry standard that defines the cables, the connectors, the communication protocols and the distribution of power required for interconnections between electronic devices. The USB standard defines several connectors including, but not limited to, USB-A, USB-B, mini-USB, and micro USB connectors.

With respect to the above description, it is to be realized that the optimum dimensional relationship for the various components of the invention described above and in FIGS. 1 through 6, include variations in size, materials, shape, form, function, and manner of operation, assembly and use, are deemed readily apparent and obvious to one skilled in the art, and all equivalent relationships to those illustrated in the drawings and described in the specification are intended to be encompassed by the invention.

It shall be noted that those skilled in the art will readily recognize numerous adaptations and modifications which can be made to the various embodiments of the present invention which will result in an improved invention, yet all of which will fall within the spirit and scope of the present invention as defined in the following claims. Accordingly, the invention is to be limited only by the scope of the following claims and their equivalents.

What is claimed is:

1. An accessory comprising:
   a plurality of grips, a base, a threaded connector, and a charger;
   wherein the accessory is an adapted for use with a personal data device;
   wherein the accessory works with a tripod;
   wherein the accessory adjustably attaches the personal data device to the tripod;
   wherein the solar powered charger attaches to the tripod;
   wherein the solar powered charger charges personal data device while the personal data device is in use and in the tripod;
   wherein the base is a strip is formed in the shape of a rectangular block;
   wherein the base is further defined with a first end and a second end;
   wherein the base supports the personal data device;
   wherein the threaded connector is a hole that is formed in the surface of the base;
   wherein the interior surface of the threaded connector is formed with an interior screw thread;
   wherein the threaded connector is formed to receive the exterior screw thread of a standard connection post;
   wherein each individual grip comprises a slider, a shaft, a plurality of clamps, and a base hole;
   wherein the slider attaches to the base;
   wherein the slider has formed in it a base hole;
   wherein the base hole is sized to receive the base;
   wherein the relative position of each individual grip to the slider is adjusted by sliding the slider through the base hole;
   wherein the relative position of each individual grip selected from the plurality of grips to the remaining grips is adjusted by sliding the slider through the base hole;
   wherein the shaft projects perpendicularly away from the slider in the direction away from the tripod;
   wherein each of plurality of clamps is a trapezoidal plate;
   wherein each of plurality of clamps projects perpendicularly away from the shaft;
   wherein the plurality of clamps further comprises a first clamp and a second clamp;
   wherein the first clamp is generally parallel with the second clamp;
   wherein the first clamp and the second clamp are formed with elasticity to form a cantilever spring.

2. The accessory according to claim 1 wherein the plurality of grips further comprises a first grip and a second grip.

3. The accessory according to claim 2 wherein
   the first end of the base is inserted through the base hole of the first grip such that the plurality of clamps of the first grip project towards the second end of the base;
   wherein the second end of the base is inserted through the base hole of the second grip such that the plurality of clamps of the second grip project towards the first end of the base.

4. The accessory according to claim 3 wherein the charger further comprises a photovoltaic cell bank and a cable.

5. The accessory according to claim 3 wherein the cable is selected from the group consisting of a USB to USB cable, a USB to an Apple Lightning connector, or a USB to an Apple 30 pin connector.

* * * * *